(12) United States Patent
Homma et al.

(10) Patent No.: US 12,597,818 B2
(45) Date of Patent: Apr. 7, 2026

(54) ROTOR FOR ROTATING ELECTRIC MACHINE

(71) Applicant: TOYOTA BOSHOKU KABUSHIKI KAISHA, Aichi-ken (JP)

(72) Inventors: Daisuke Homma, Anjo (JP); Takeshi Nomura, Chiryu (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 226 days.

(21) Appl. No.: 18/648,624

(22) Filed: Apr. 29, 2024

(65) Prior Publication Data

US 2024/0380263 A1 Nov. 14, 2024

(30) Foreign Application Priority Data

May 9, 2023 (JP) .................................. 2023-077123

(51) Int. Cl.
*H02K 1/28* (2006.01)
*H02K 1/276* (2022.01)

(52) U.S. Cl.
CPC .............. *H02K 1/28* (2013.01); *H02K 1/276* (2013.01)

(58) Field of Classification Search
CPC ................................. H02K 1/28; H02K 1/276
See application file for complete search history.

(56) References Cited

U.S. PATENT DOCUMENTS

| | | | | |
|---|---|---|---|---|
| 6,274,960 B1 * | 8/2001 | Sakai | ..................... | H02K 1/246 |
| | | | | 310/168 |
| 2009/0230803 A1 * | 9/2009 | Nakayama | ........... | H02K 1/2766 |
| | | | | 310/156.56 |
| 2012/0205573 A1 * | 8/2012 | Komuro | ............... | H02K 1/2766 |
| | | | | 252/62.51 R |

FOREIGN PATENT DOCUMENTS

JP 2017-103836 6/2017

* cited by examiner

*Primary Examiner* — Terrance L Kenerly

(74) *Attorney, Agent, or Firm* — GREENBLUM & BERNSTEIN, P.L.C.

(57) ABSTRACT

A rotor for a rotating electric machine includes a cylindrical rotor core, a housing hole extending through the rotor core in a direction of a center line of the rotor core, a permanent magnet that is fixed while being accommodated in the housing hole, and a fixing member made of a plastic that fills a gap between an inner surface of the housing hole and an outer surface of the permanent magnet. The permanent magnet is split into two segments such that division surfaces extend in the direction of the center line. The permanent magnet is disposed such that a distance between the two segments decreases from a first end to a second end of the segments in the direction of the center line.

6 Claims, 3 Drawing Sheets

ROTOR FOR ROTATING ELECTRIC MACHINE

CROSS-REFERENCE TO RELATED APPLICATIONS

This application is based upon and claims the benefit of priority from prior Japanese Patent Application No. 2023-077123, filed on May 9, 2023, the entire contents of which are incorporated herein by reference.

BACKGROUND

1. Field

The present disclosure relates to a rotor for a rotating electric machine.

2. Description of Related Art

A magnet-embedded rotor has been known as a rotor for a rotating electric machine (refer to Japanese Laid-Open Patent Publication No. 2017-103836). This type of rotor includes a cylindrical rotor core. The rotor core includes housing holes extending through the rotor core in the direction of the center line. Permanent magnets are fixed while being accommodated in the respective housing holes.

In the rotor disclosed in the above-described publication, a fixing member made of plastic is provided to fill the gap between the outer surface of the permanent magnet and the inner surface of each housing hole of the rotor core. The permanent magnet is secured in the housing hole with the fixing member in between the permanent magnet and the housing hole.

In the above-described rotor, if each permanent magnet is fixed inside the housing hole merely by the fixing member, an impact applied to the rotating electric machine (rotor) may dislodge the permanent magnet. For example, the permanent magnet may be detached from the fixing member and exit from the housing hole of the rotor core.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a rotor for a rotating electric machine includes a cylindrical rotor core, a housing hole extending through the rotor core in a direction of a center line of the rotor core, a permanent magnet that is fixed while being accommodated in the housing hole, and a fixing member made of a plastic that fills a gap between an inner surface of the housing hole and an outer surface of the permanent magnet. The permanent magnet is split into two segments such that division surfaces extend in the direction of the center line. The permanent magnet is disposed such that a distance between the two segments decreases from a first end to a second end of the segments in the direction of the center line.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A rotor 10 for a rotating electric machine according to one embodiment will now be described.

Rotor Core

Figure 1:
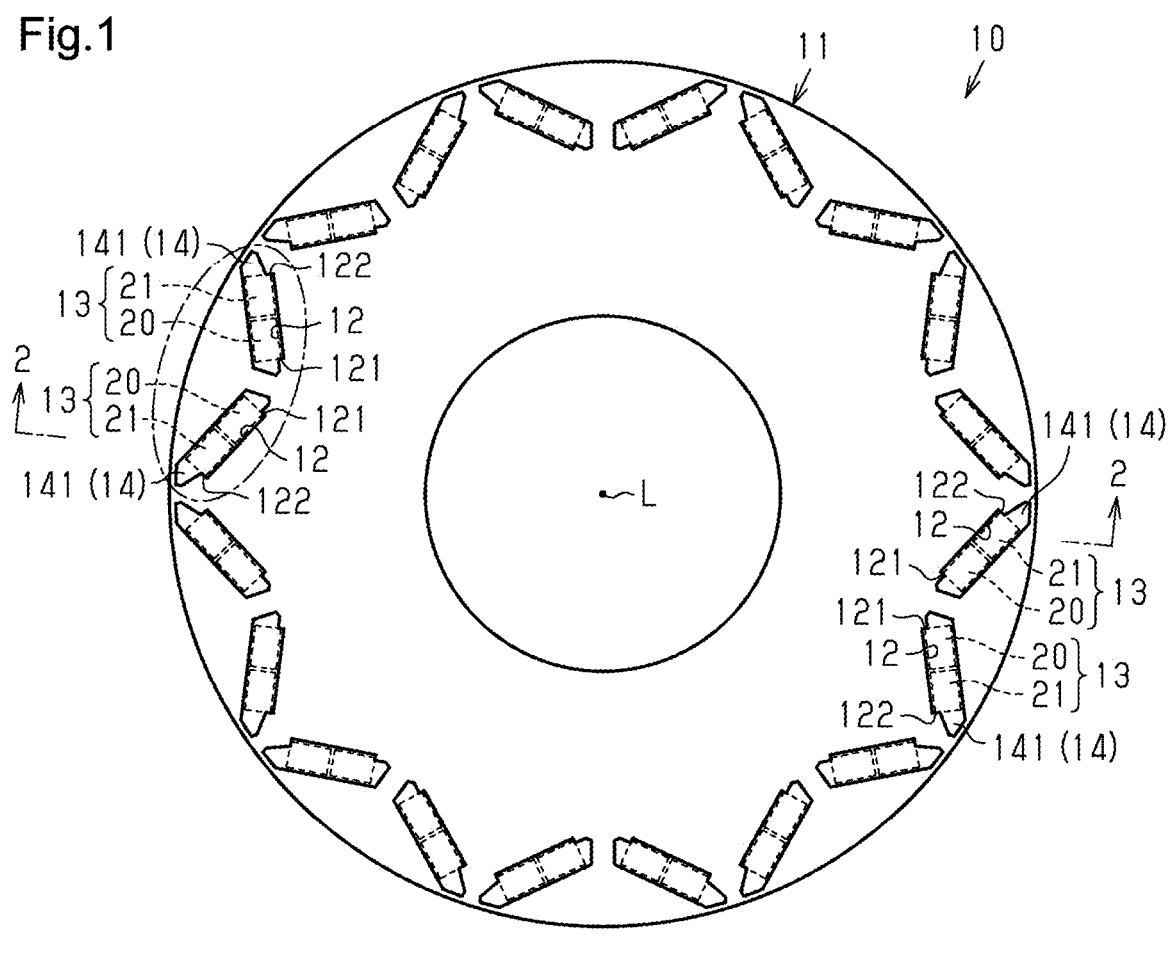
FIG. 1 is a plan view of a rotor for a rotating electric machine according to one embodiment.
Figure 2:
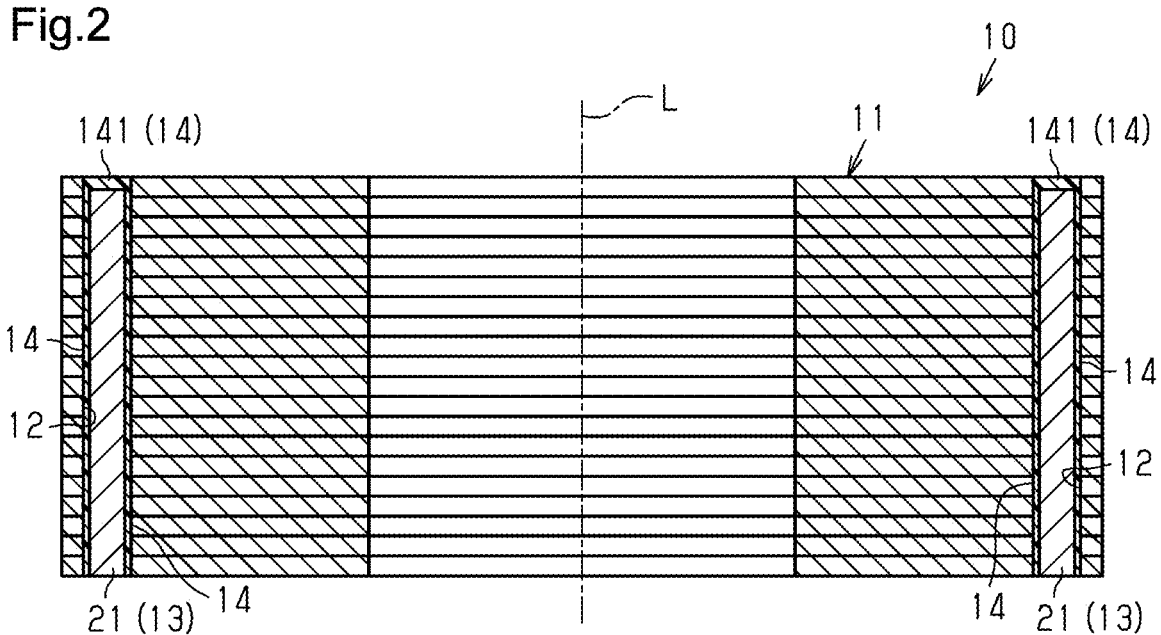
FIG. 2 is a cross-sectional side view of the rotor taken along line 2-2 in FIG. 1.
Figure 3:
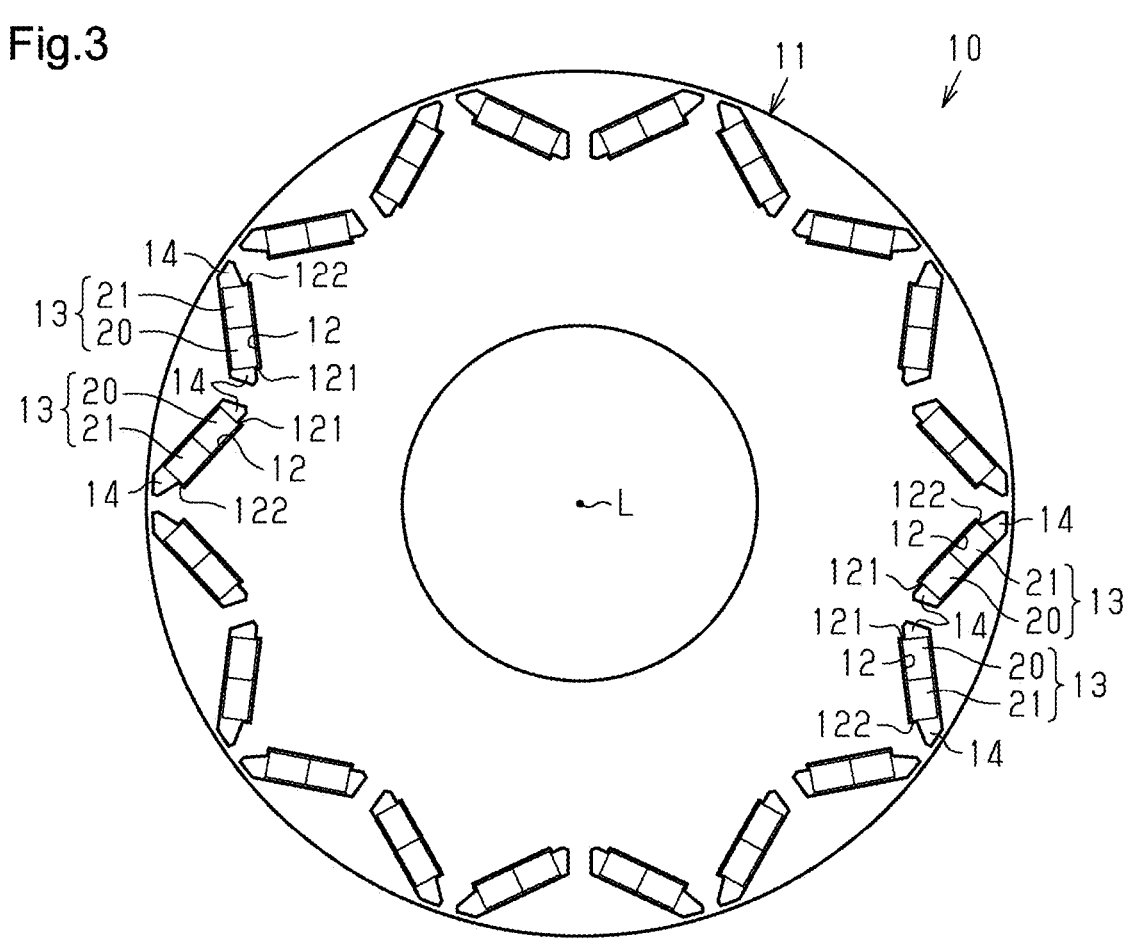
FIG. 3 is a bottom view of the rotor.

As shown in FIGS. 1 to 3, the rotor 10 includes a cylindrical rotor core 11. The rotor core 11 has a structure in which annular flat magnetic steel sheets are stacked together. The rotating electric machine in which the rotor 10 of the present embodiment is employed is a permanent magnet excited synchronous motor.

Housing Holes

The rotor core 11 includes multiple (in the present embodiment, twenty) housing holes 12, which extend in the direction in which a center line L of the rotor 10 extends (hereinafter, referred to as a direction of the center line L). The housing holes 12 are arranged at intervals in the circumferential direction of the rotor core 11. Specifically, the rotor core 11 includes a total of ten pairs of adjacent housing holes 12 arranged in the circumferential direction. Each housing hole 12 in each pair has an elongated cross section and extends such that a section closer to the other housing hole 12 is located further radially inward.

Permanent Magnets and Fixing Members

A permanent magnet 13 is inserted into each housing hole 12 so as to be accommodated inside the housing hole 12. Each permanent magnet 13 is fixed to the rotor core 11 with a fixing member 14 in between the permanent magnet 13 and the rotor core 11. Specifically, the permanent magnet 13 is fixed to the inner surface of the corresponding housing hole 12. The fixing members 14 are made of a thermoplastic (for example, liquid crystal polymer). The fixing member 14 is provided to fill the gap between the inner surface of the housing hole 12 and the outer surface of the permanent magnet 13.

In the rotor 10 of the present embodiment, each magnetic pole of the rotating electric machine is formed by a pair of the permanent magnets 13, which are inserted in and fixed to two of the housing holes 12, which are configured such that a section of each housing hole 12 closer to the other housing hole 12 is located further radially inward. The rotor 10 of the present embodiment has a structure in which ten magnetic poles (five pairs of magnetic poles), and the magnetic poles, which are north poles and south poles, are arranged alternately in the circumferential direction.

If each permanent magnet 13 is fixed to the inner surface of the corresponding housing hole 12 merely by the fixing member 14, an impact applied to the rotor 10 may dislodge the permanent magnet 13. For example, the permanent magnet 13 may be detached from the fixing member 14 and exit from the rotor core 11.

Manner in Which Permanent Magnets are Fixed

In the rotor 10 of the present embodiment, the permanent magnets 13 are fixed in the housing holes 12 so as to prevent the permanent magnets 13 from falling off. A manner in which the permanent magnets 13 are fixed will now be described.

Figure 4:
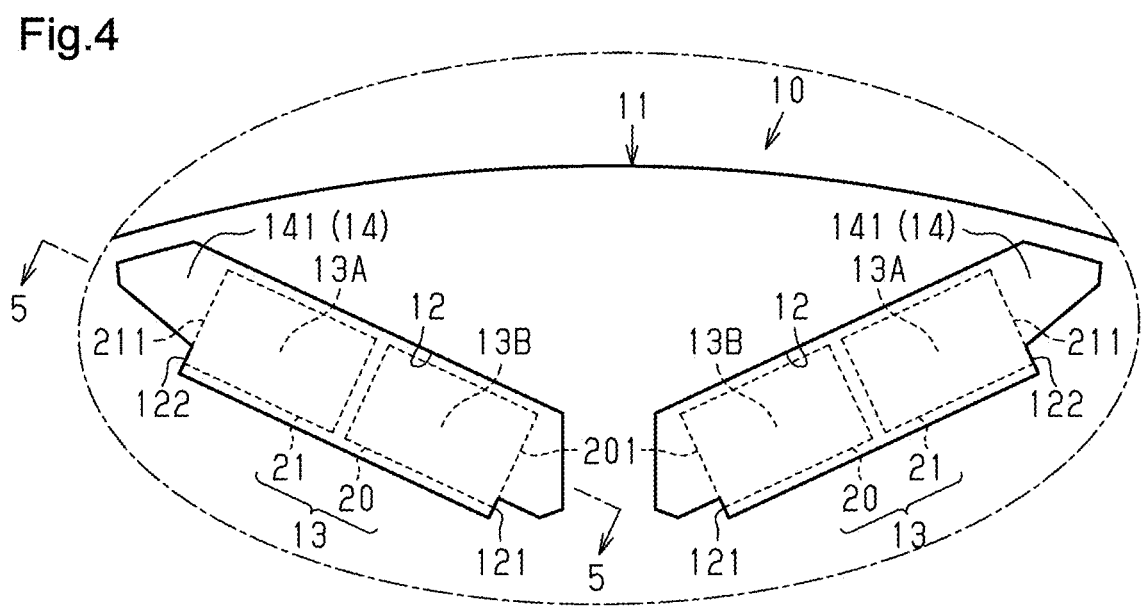
FIG. 4 is a plan view of a region of the rotor indicated by a long-dash short-dash line in FIG. 1.
Figure 5:
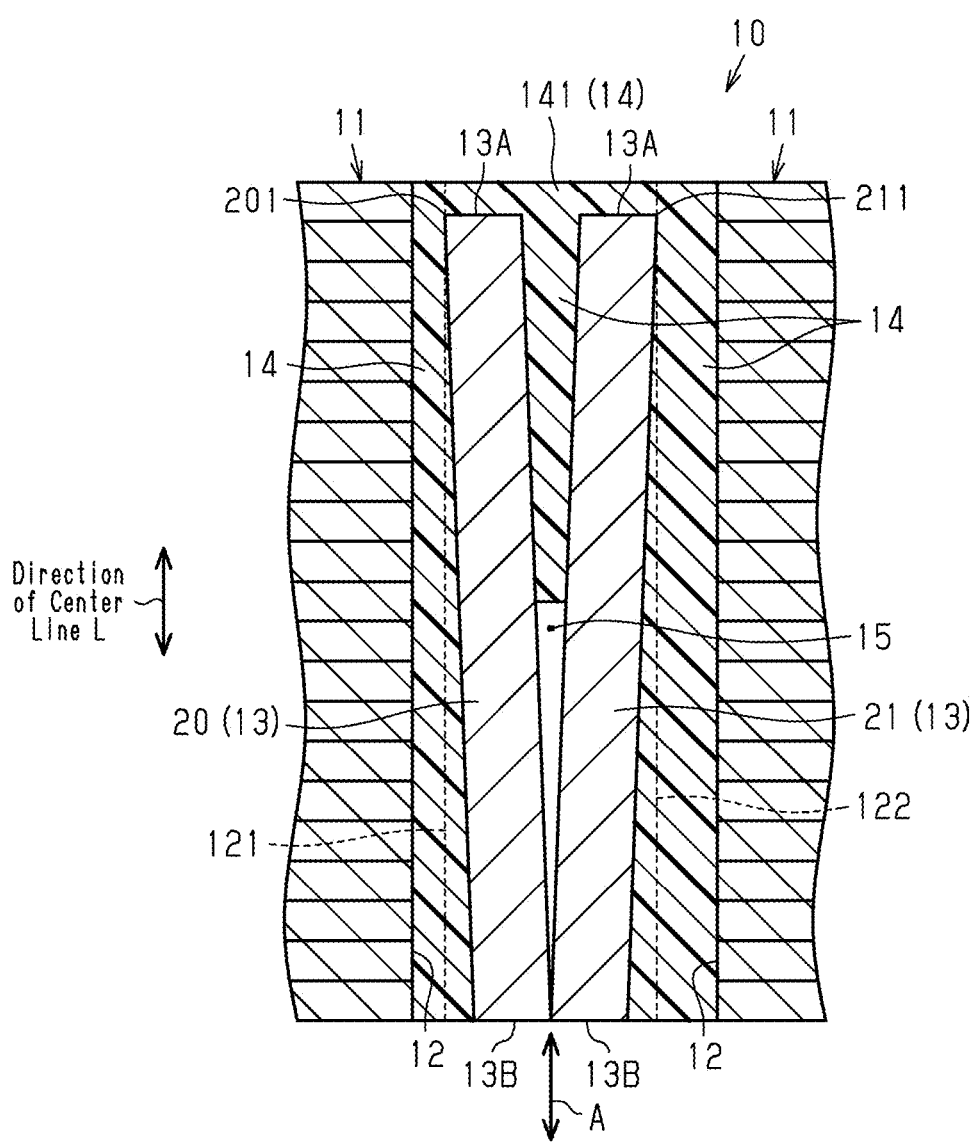
FIG. 5 is a cross-sectional side view of the rotor taken along line 5-5 in FIG. 4.

As shown in FIGS. 4 and 5, the permanent magnet 13 accommodated in each housing hole 12 is formed by two segments 20, 21. Specifically, the permanent magnet 13 accommodated in each housing hole 12 is divided into two segments 20, 21 such that the division surfaces extend in the direction of the center line L and in the transverse direction of the housing hole 12.

The two segments 20, 21 of the permanent magnet 13 are arranged in the lengthwise direction of the housing hole 12. Furthermore, when the permanent magnet 13 is viewed from the transverse direction of the housing hole 12, the two segments 20, 21 are arranged in a V-shaped configuration. Specifically, the two segments 20, 21 are arranged such that the distance between them narrows from one end (herein-after, referred to as a first end 13A) in the direction of the center line L towards the other end (hereinafter, referred to as a second end 13B) in the direction of the center line L. In FIG. 5, the distance between the two segments 20 and 21 is exaggerated to facilitate understanding of the manner in which permanent magnet 13 is fixed.

At the first end 13A, the two segments 20, 21 are in contact with the inner surface of the housing hole 12 at outer sections in the arrangement direction of the two segments 20, 21. Specifically, a section 201 at the first end 13A of the segment 20 that is on the side farther from the segment 21 is in contact with the inner surface of the housing hole 12. Also, a section 211 at the first end 13A of the segment 21 that is on the side farther from the segment 20 is in contact with the inner surface of the housing hole 12.

Steps 121, 122 are formed on the inner surface of the housing hole 12. The steps 121, 122 have such shapes that a central section in the lengthwise direction of the housing hole 12 has a longer dimension in the transverse direction of the housing hole 12 than end sections in the lengthwise direction. In the rotor 10 of the present embodiment, the step 121 is in contact with the section 201 of the segment 20 at the first end 13A, and the step 122 is in contact with the section 211 of the segment 21 at the first end 13A.

As shown in FIGS. 3 and 5, edges of the two segments 20, 21 are in contact with each other at the second end 13B. Specifically, the edge of the segment 20 at the second end 13B on the side closer to the segment 21 is in contact with the edge of the segment 21 at the second end 13B on the side closer to the segment 20.

The fixing member 14 is basically shaped so as to fill the gap between the inner surface of the housing hole 12 and the outer surfaces of the segments 20, 21 and the gap between the two segments 20 and 21.

Lid Portion

As shown in FIGS. 4 and 5, the fixing member 14 includes a lid portion 141. The lid portion 141 is shaped to entirely close the opening of the housing hole 12 on the side corresponding to the first end 13A (the upper side as viewed in FIG. 5). The lid portion 141 covers the first end 13A of the two segments 20, 21, which form the permanent magnet 13. The parts of the two segments 20, 21 at the first end 13A are in contact with the inner surface of the lid portion 141. In the rotor 10 of the present embodiment, the parts of the two segments 20, 21 at the second end 13B are not covered with the fixing member 14 and are exposed to the outside of the rotor 10.

In the rotor 10 of the present embodiment, the outer surface of the fixing member 14 and the inner surface of the housing hole 12 are substantially in close contact with each other in an area where the outer surface of the fixing member 14 and the inner surface of the housing hole 12 are arranged to face each other. As a result, the outer surface of the fixing member 14 has a shape conforming to the inner surface of the housing hole 12. Specifically, in the area where the outer surface of the fixing member 14 and the inner surface of the housing hole 12 are arranged to face each other, part of the outer edge of the fixing member 14 is in gaps between the magnetic steel sheets in the inner surface of the housing hole 12. In the rotor 10 of the present embodiment, the portion having the above-described structure exhibits an anchoring effect, which prevents the fixing member 14 from being dislodged from the housing hole 12.

Void

As shown in FIG. 5, in the rotor 10 of the present embodiment, a section of the portion between the two segments 20 and 21 closer to the second end 13B (the lower side as viewed in FIG. 5) is a void 15, in which the fixing member 14 is not present. Specifically, the fixing member 14 fills a section of the portion between the two segments 20 and 21 that is closer to the first end 13A. In contrast, the fixing member 14 is not provided in the section of the portion between the two segments 20 and 21 that is closer to the second end 13B.

Operation and Advantages

The present embodiment achieves the following advantages.

(1) The rotor 10 includes the fixing members 14. Each fixing member 14 is provided to fill the gap between the inner surface of the corresponding housing hole 12 and the outer surface of the corresponding permanent magnet 13. The permanent magnet 13 accommodated in each housing hole 12 is divided into two segments 20, 21 such that the division surfaces extend in the direction of the center line L and in the transverse direction of the housing hole 12. The two segments 20, 21 are arranged in the housing hole 12 such that the distance between the segments 20 and 21 decreases from the first end 13A toward the second end 13B in the direction of the center line L.

In the rotor 10 of the present embodiment, the space in which the permanent magnet 13, which includes the two segments 20, 21, is retained inside the fixing member 14 is tapered from the first end 13A toward the second end 13B of the segments 20, 21 (permanent magnet 13). The permanent magnet 13, which is formed by the two segments 20, 21, is arranged in the fixing member 14 so as to have the shape of a wedge.

In the present embodiment, when an impact applied to the rotor 10 generates a force pushing each permanent magnet 13 toward the side corresponding to the second end 13B, the permanent magnet 13 is pushed into the tapered portion of the fixing member 14. In this case, the inner surface of the fixing member 14 comes into contact with the outer surface of the permanent magnet 13, which restricts movement of the two segments 20, 21, which form the permanent magnet 13, toward the second end 13B. Since the present embodiment restricts each permanent magnet 13 from being dislodged from the side corresponding to the second end 13B as described above, the structure of the rotor 10 is resistant to dislodgement of the permanent magnets 13.

(2) The fixing member 14 includes the lid portion 141. The lid portion 141 is shaped to close the opening of the housing hole 12 at the side corresponding to the first end 13A.

In the rotor 10 of the present embodiment, the opening of the housing hole 12 of the rotor core 11 on the side corresponding to the first end 13A is closed by the lid portion 141, which forms part of the fixing member 14. Thus, when an impact applied to the rotor 10 generates a force pushing the permanent magnet 13 toward the side corresponding to the first end 13A, the sections at the first end 13A of the two segments 20, 21, which form the permanent magnet 13, are pressed against the lid portion 141. This restricts movement of the permanent magnet 13 (more specifically, two segments 20, 21) toward the side corresponding to the first end 13A, thereby preventing the permanent magnet 13 from being dislodged from the side corresponding to the first end 13A. The present embodiment achieves the structure of the rotor 10 that is resistant to dislodgement of the permanent magnet 13.

(3) At the first end 13A, the two segments 20, 21, which form the permanent magnet 13, are in contact with the inner surface of the housing hole 12 at the sections 201, 211, which are located on the outer sides in the arrangement direction of the two segments 20, 21.

In the present embodiment, when a force pushing the permanent magnet 13 toward the side corresponding to the first end 13A is generated, the first end 13A of the permanent magnet 13 (specifically, the two segments 20, 21) is pressed against the inner surface of the housing hole 12 of the rotor core 11. The first end 13A of the permanent magnet 13 is pressed against the inner surface of the housing hole 12 in this manner. This restricts the permanent magnet 13 from moving toward the side corresponding to the first end 13A. This reliably prevents the permanent magnet 13 from being dislodged from the side corresponding to the first end 13A.

(4) The two segments 20, 21 are arranged such that the sections at the second end 13B are in contact with each other.

In the rotor 10 of the present embodiment, when a force pushing the permanent magnet 13 toward the side corresponding to the second end 13B is generated, the permanent magnet 13 is pushed into the tapered portion of the fixing member 14. At this time, the sections at the second end 13B of the two segments 20, 21, which form the permanent magnet 13, are pressed against each other. Since the sections at the second end 13B of the segments 20, 21 are pressed against each other in this manner, further movement of the segments 20, 21 toward the side corresponding to the second end 13B is restricted. This reliably prevents the permanent magnet 13 from being dislodged from the side corresponding to the second end 13B.

(5) A section of the portion between the two segments 20 and 21 closer to the second end 13B is the void 15, in which the fixing member 14 is not present.

In the present embodiment, if the rotor 10 is employed in an oil-cooled rotating electric machine, the void 15, which is located between the two segments 20 and 21, can be used as a coolant chamber into which cooling oil enters. In the rotor 10 of the present embodiment, the section at the second end 13B of the permanent magnet 13 is not covered with the fixing member 14 and is exposed to the outside of the rotor 10. Thus, as indicated by arrow A in FIG. 5, some of the cooling oil can be drawn into the void 15 through the gap between the two segments 20 and 21 at the second end 13B of the permanent magnet 13. This structure cools the permanent magnet 13, which is a heat source, in a favorable manner.

In the rotor 10 of the present embodiment, a section that is located between the two segments 20 and 21 and is closer to the second end 13B has a cross-sectional shape in which stress tends to concentrate (specifically, a cross-sectional acute triangular shape). In the present embodiment, the fixing member 14, which is made of plastic, is not provided in such a section having a cross-sectional shape in which stress tends to concentrate. Specifically, the fixing member 14 is not provided in the void 15. Thus, although the fixing member 14 is provided to fill the gap between the inner surface of the housing hole 12 and the outer surfaces of the segments 20, 21 and the gap between the two segments 20, 21, stress concentration in the fixing member 14 is prevented.

Modifications

The above-described embodiment may be modified as follows. The above-described embodiment and the following modifications can be combined as long as the combined modifications remain technically consistent with each other.

The two segments 20, 21 may be arranged so that the sections at the second end 13B of the segments 20, 21 are slightly separated from each other.

The two segments 20, 21 may be arranged such that, at the first end 13A, the sections 201, 211 of the segments 20, 21 on the outer sides in the arrangement direction are spaced apart from the inner surface of the housing hole 12.

The lid portion 141 may be omitted. In this case, a plate member (so-called end plate), which closes the opening of the housing hole 12 at a side corresponding to the first end 13A, may be provided to prevent the permanent magnet 13 from being dislodged from the side corresponding to the first end 13A.

The void 15 may be omitted. Specifically, the fixing member 14, which is made of plastic, may be provided to fill the entire gap between the two segments 20 and 21.

The permanent magnet 13 accommodated in each housing hole 12 may have a structure divided into two segments such that the division surfaces extend in the direction of the center line L and in the lengthwise direction of the housing hole 12. In this case, the two segments may be arranged in the transverse direction of the housing hole 12. When the permanent magnet 13 is viewed from the lengthwise direction of the housing hole 12, the segments are preferably arranged in a V-shaped configuration.

Instead of forming the fixing members 14 from a thermoplastic, the fixing members 14 may be formed from a thermosetting plastic.

The rotor of the above-described embodiment is not limited to a rotor having ten magnetic poles (five pairs of poles), and may be a rotor having any number of magnetic poles (four poles, six poles, eight poles, or twelve poles).

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A rotor for a rotating electric machine, comprising:
a cylindrical rotor core;
a housing hole extending through the rotor core in a direction of a center line of the rotor core;
a permanent magnet that is fixed while being accommodated in the housing hole; and
a fixing member made of a plastic that fills a gap between an inner surface of the housing hole and an outer surface of the permanent magnet, wherein
the permanent magnet is split into two segments such that division surfaces extend in the direction of the center line, and the permanent magnet is disposed such that a distance between the two segments decreases from a first end to a second end of the segments in the direction of the center line.

2. The rotor for a rotating electric machine according to claim 1, wherein the fixing member includes a lid portion that closes an opening of the housing hole at a side corresponding to the first end.

3. The rotor for a rotating electric machine according to claim 1, wherein, at the first end, the permanent magnet is in contact with the inner surface of the housing hole at outer sections in the arrangement direction of the two segments.

4. The rotor for a rotating electric machine according to claim 1, wherein the permanent magnet is arranged such that sections at the second end of the two segments are in contact with each other.

5. The rotor for a rotating electric machine according to claim 1, wherein a section of a portion between the two segments closer to the second end is a void in which the fixing member is not present.

6. The rotor for a rotating electric machine according to claim 1, wherein the fixing member is made of a thermoplastic.

* * * * *